H. Aiken.
Making Car-Wheels.
N° 7,229.    Patented Apr. 2, 1850.
Fig. 1.
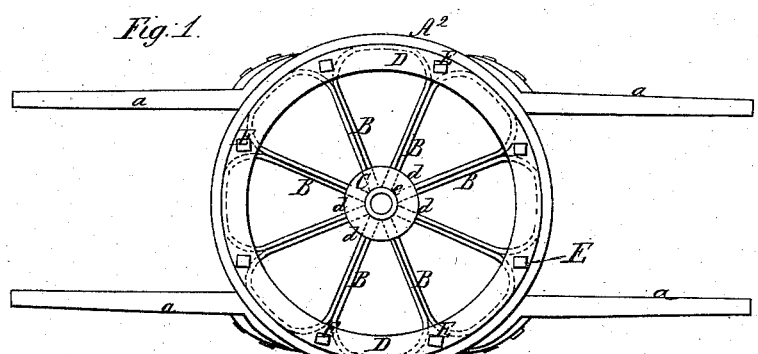
Fig. 2.
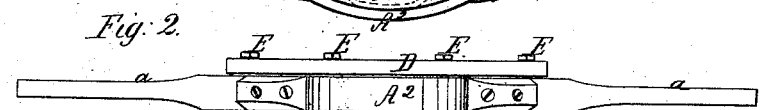
Fig. 4.    Fig. 3.    Fig. 5.
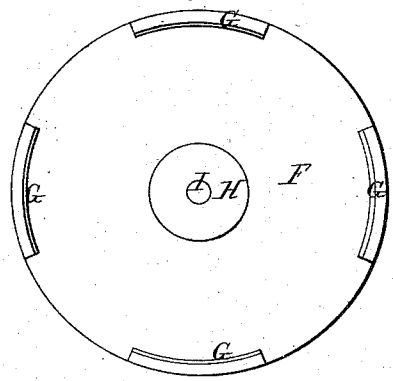 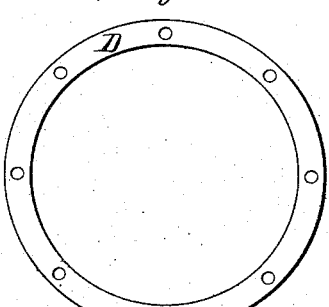 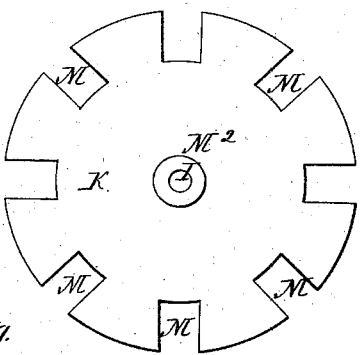
Fig. 9.
Fig. 6.    Fig. 8.
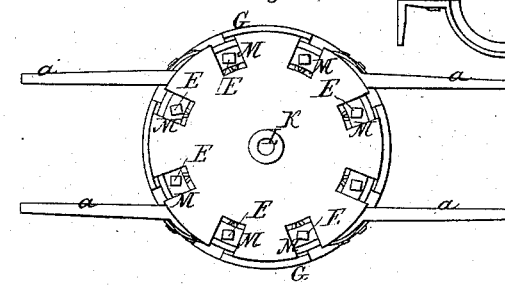
Fig. 7.
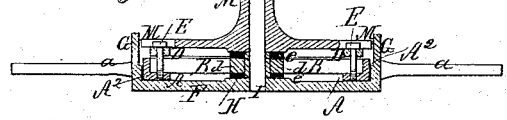
THE GRAPHIC CO.PHOTO-LITH.39 & 41 PARK PLACE, N.Y.

UNITED STATES PATENT OFFICE.

HERRICK AIKEN, OF FRANKLIN, NEW HAMPSHIRE.

CLAMP TO BE USED IN THE MANUFACTURE OF WROUGHT-IRON CAR-WHEELS.

Specification of Letters Patent No. 7,229, dated April 2, 1850.

*To all whom it may concern:*

Be it known that I, HERRICK AIKEN, of the town of Franklin, county of Merrimack and State of New Hampshire, have invented certain new and useful Improvements in Machinery or Tools for Making Wrought-Iron Car-Wheels, which are described as follows, reference being had to the annexed drawings of the same making part of this specification.—

Figure 1 is a plan of the clamp containing a set of arms or spokes, plates, and tube to form the hub, showing those parts arranged in a proper position for welding them together. The clamp A is made in a circular form having a horizontal and perpendicular projection A A² with handles (*a a*) attached and holes made for screw-bolts, the heads of which being shown at *i*. Fig. 2 is a side view of Fig. 1. Fig. 3 is a plan of the ring or cap plate D, of the clamp A, showing the holes for the bolts E, to screw the several parts together. Fig. 4 is a plan of the bed plate F, in which the clamp, (containing the arms and hub) is placed, and held while driving the punch through the hole in the center of the hub. The bed plate F is made with a horizontal bottom, and a suitable number of perpendicular projections G, having spaces (*f*) to receive the handles (*a*) of the clamp. Fig. 5, is a plan of the guide plate K which is made in a circular form with spaces M, to receive the bolts E, and a projection M² in the center to guide the punch. Fig. 6, is a plan of the bed plate K, containing the clamp Fig. 1, with the arms, hub, ring D, and guide plate K Fig. 5. Fig. 7 is a vertical section of Fig. 6, showing the several parts put together ready for driving the punch through the hole in the center of the cap plate, hub, and bed plate. Fig. 8, is a plan of a car wheel when finished. Fig. 9, is a clamp made in two parts and held together by screw bolts, having arms and handles attached which are made in a different form and shape from Fig. 1, but designed for the same object.

Method of operation: The several pieces of iron to make the arms and hub, being properly prepared of suitable dimensions and brought to the desired form and shape are placed in the clamp Fig. 1, and confined by the ring plate D Fig. 3, with the screw bolts E, for the purpose of welding the several parts together which operation is performed in the usual manner of welding iron. The clamp A, containing the arms and hub is then placed in the bed plate F, Fig. 4, and the guide plate K, Fig. 5, is also placed in the bed plate F, over the clamp, hub, and arms, the punch is then driven through the hole I, in the guide plate, hub, and bed plate, which brings the hole for the axle true in the center of the hub, and circumference of the arms, and at a right angle with, this operation is performed immediately after the welding is completed while the hub is in a heated state. When the hub and spokes are prepared as above described (the rim also being properly prepared) they are attached together in the usual way by heating the rim to expand the iron and enlarge the size to admit the hub and arms which are then inserted and the rim being cooled contracts upon the arms and confines the whole together in a permanent manner.

The object to be attained by this improvement is to facilitate the operation and reduce the cost of manufacturing wrought iron car wheels.

Having thus described my invention and improvement in the method of making wrought iron car wheels, what I claim as my invention and desire to secure by Letters Patent, is—The construction and application of the above described combined cylindrical clamp consisting of the following parts, namely the ring A A² of an L-shaped section with handles (*a a*) attached and ring D, and screw bolts E, applied for the purpose of confining and holding the wrought iron arms B, or spokes in a true circle together with the pieces *c*, *d*, *e*, in the center to form the hub during the operation of welding the several parts together as above described.

In testimony whereof I have hereunto signed my name before two subscribing witnesses.

HERRICK AIKEN.

Witnesses:
LUND WASHINGTON,
HARRY E. B. DENNISON.